Patented Aug. 13, 1935

2,011,447

UNITED STATES PATENT OFFICE 2,011,447

COMPOSITION OF MATTER

Oliver Kamm, Grosse Pointe, and Irvine W. Grote, Detroit, Mich., assignors to Parke, Davis & Company, Detroit, Mich., a corporation of Michigan No Drawing. Application June 9, 1931, Serial No. 543,236

5 Claims. (Cl. 167—74)

The invention relates to therapeutic agents obtained from the pituitary gland.

We have discovered a new pituitary substance having physiological properties different from all other pituitary products heretofore described. Our new product contains what may be termed a derived hormone since it is obtained by chemical treatment of a pituitary gland material containing another hormone of the gland.

The derived pituitary hormone is preferably obtained from a pituitary substance containing the pressor principle substantially free from the oxytocic principle and from inert protein material. The ordinary commercial pituitary extracts containing both the pressor and the oxytocic hormones can be used however. The process involves the treatment of a solution of such pituitary material with a reagent which will destroy or materially reduce the pressor, oxytocic and sugar elevating properties of the extract while producing a new physiologically active compound preserving the powerful anti-diuretic activity of pituitary extract. The new substance resulting from this process is a valuable therapeutic agent useful in treatment of conditions requiring an anti-diuretic effect where a corresponding rise in blood pressure is undesirable or at least unnecessary.

The preferred process is as follows:

A solution of purified pituitary substance high in pressor activity and low in oxytocic activity containing about 25 pressor units (the equivalent of 12½ mg. of the U. S. P. Standard Pituitary Powder) per cc. dissolved in $\frac{1}{10}$% acetic acid is treated with ¼ to 4 mg. sodium bisulphite per cc. If the pituitary solids are over ¼ mg. per cc., a white precipitate may form after some time and may be filtered off, leaving a clear solution having anti-diuretic activity but practically no pressor or oxytocic activity. If pressor material of very high purity is used, no precipitation will take place, while if a cruder product is used, a heavy precipitate may form immediately. Regardless of whether precipitation takes place, the pressor and oxytocic activities will disappear. The action is very quick at ordinary temperatures but it is usually desirable to permit the reaction mixture to stand for a longer period (24 hours or more) in order to more readily and completely remove the precipitate. After proper standardization for anti-diuretic effect, the solution prepared as described may be diluted to the proper strength desired and is ready for use without further treatment.

In the above process, the strength of the pituitary solution and of the reacting chemical added may be suitably adjusted. The preferred solution of the pituitary material is a water solution or a slightly acid solution but any other medium in which the pituitary material is soluble might also be used. In lieu of sodium bisulphite specifically referred to, other materials may be used such as sodium sulphite, sodium thiosulphate, sodium hydrosulphite and sulphur dioxide or other chemical equivalent but ordinary bisulphites are preferred. The excess of reaction chemical may be removed after a period, if desired, by addition of a mild oxidizing agent, such as iodine, but in general this does not seem necessary.

The new substance when administered to dogs in the usual manner for pituitary products has substantially no effect on the blood pressure. It has, however, a marked anti-diuretic effect on mice and is preferably standardized on mice in the same manner as other pituitary products heretofore known.

The solution of the derived pituitary hormone made by bisulphite treatment in accordance with this invention differs somewhat in chemical properties from the corresponding hormone obtained by alkali treatment as set forth in Grote application, Serial No. 529,292, filed April 10, 1931. The product resulting from the present invention loses the anti-diuretic activity upon evaporation to dryness and treatment of the dry residue with glacial acetic acid, although such treatment was without injurious effect upon the product of the co-pending application. Furthermore, much of the anti-diuretic effect of the product of the present invention is lost on boiling in neutral solution for short periods. The new process also differs from the process of the Grote application, Serial No. 529,292 in that hydrogen sulphide or other volatile sulphur compounds are not produced by the reaction with bisulphites although they are formed in the alkali process.

From the foregoing description it will be observed that we have produced a new therapeutic product containing a new derived hormone from the pituitary gland and this differs chemically and physiologically from any products heretofore known. We have also devised a new process for obtaining the product.

What we claim as our invention is:

1. A solution containing an extract of the posterior lobe of the pituitary gland having anti-diuretic activity and free from pressor and oxytocic activity, said solution having the property of losing a portion of the anti-diuretic activity when boiled in neutral solution or when evaporated to dryness and taken up with glacial acetic acid.

2. The process of obtaining a derived pituitary hormone comprising the treatment of a water solution of a purified pituitary substance high in pressor activity, low in oxytocic activity and containing anti-diuretic activity with a reagent of the class consisting of sodium bisulphite, sodium sulphite, sodium thiosulphate, sodium hydrosulphite and sulphur dioxide, thereby destroying substantially all the pressor and oxytocic activity and forming a derived hormone having anti-diuretic activity.

3. A therapeutic agent comprising an extract of the posterior lobe of the pituitary which has been treated with sodium bisulphite until pressor and oxytocic activity has been substantially destroyed, said therapeutic agent having anti-diuretic activity, having the property of losing a portion of the anti-diuretic activity when boiled in neutral solution or when evaporated to dryness and taken up with glacial acetic acid and said therapeutic agent when in the solid form being water soluble.

4. A therapeutic agent comprising an extract of the pituitary gland which has been treated with a chemical agent of the class consisting of bisulphites, sulphites, thiosulphates, hydrosulphites and sulphur dioxide until pressor and oxytocic activity has been substantially destroyed, said therapeutic agent having anti-diuretic activity, having the property of losing a portion of the anti-diuretic activity when boiled in neutral solution or when evaporated to dryness and taken up with glacial acetic acid and said therapeutic agent when in the solid form being water soluble.

5. The process of obtaining an anti-diuretic therapeutic agent comprising the treatment of a solution of a pituitary product having anti-diuretic activity and having pressor activity with sodium bisulphite thereby destroying the pressor activity while retaining anti-diuretic activity and separating the solution containing the anti-diuretic activity from any solid matter.

OLIVER KAMM.
IRVINE W. GROTE.